(12) United States Patent
Huang

(10) Patent No.: US 10,423,773 B1
(45) Date of Patent: Sep. 24, 2019

(54) COMPUTERIZED SYSTEMS AND METHODS FOR DETERMINING AUTHENTICITY USING MICRO EXPRESSIONS

(71) Applicant: Coupang, Corp., Seoul (KR)

(72) Inventor: Xiaojun Huang, Shanghai (CN)

(73) Assignee: COUPANG, CORP., Seoul (KR)

( * ) Notice: Subject to any disclaimer, the term of this patent is extended or adjusted under 35 U.S.C. 154(b) by 0 days.

(21) Appl. No.: 16/383,297

(22) Filed: Apr. 12, 2019

(51) Int. Cl.
 G06F 21/32 (2013.01)
 G06N 3/04 (2006.01)

(52) U.S. Cl.
 CPC ............ *G06F 21/32* (2013.01); *G06N 3/0454* (2013.01)

(58) Field of Classification Search
 CPC ...................................................... G06F 21/32
 See application file for complete search history.

(56) References Cited

U.S. PATENT DOCUMENTS

| | | | | |
|---|---|---|---|---|
| 9,619,723 B1* | 4/2017 | Chow | ................ | G06K 9/00288 |
| 2009/0003709 A1* | 1/2009 | Kaneda | ................ | G06K 9/4628 |
| | | | | 382/190 |
| 2009/0309702 A1* | 12/2009 | Hirai | ........................ | G06F 21/32 |
| | | | | 340/5.83 |
| 2010/0189358 A1* | 7/2010 | Kaneda | .............. | G06K 9/00744 |
| | | | | 382/195 |
| 2011/0032378 A1* | 2/2011 | Kaneda | .............. | G06K 9/00288 |
| | | | | 348/222.1 |
| 2012/0204225 A1* | 8/2012 | Cohen | ..................... | G06F 21/32 |
| | | | | 726/3 |
| 2014/0289867 A1* | 9/2014 | Bukai | ................ | G06Q 20/4016 |
| | | | | 726/28 |
| 2018/0075565 A1* | 3/2018 | Myers | ....................... | G06K 9/00 |
| 2018/0211102 A1* | 7/2018 | Alsmadi | ................ | G06N 3/126 |
| 2019/0155386 A1* | 5/2019 | Tadi | ........................ | G06F 3/015 |

OTHER PUBLICATIONS

Zhang et al.; Face recognition: eigenface, elastic matching, and neural nets; Published in: Proceedings of the IEEE (vol. 85, Issue: 9, Sep. 1997); pp. 1423-1435; IEEE Xplore (Year: 1997).*

(Continued)

*Primary Examiner* — Bradley W Holder
(74) *Attorney, Agent, or Firm* — Finnegan, Henderson, Farabow, Garrett & Dunner, LLP

(57) ABSTRACT

Systems and methods are provided for calculating authenticity of a human user. One method comprises receiving, via a network, an electronic request from a user device, instantiating a video connection with the user device; generating, using a database of questions, a first question; providing, via the network, the generated question to the user device; analyzing video and audio data received via the connection to extract facial expressions, calculating, using convolutional neural networks, first data and second data corresponding predetermined emotions based on facial expressions and audio data; generating candidate emotion data using the first and second data; determining whether the candidate emotion data predicts a predetermined emotion, and generating a second question to collect additional data for aggregating with the first and second data or determining the authenticity of the user and using the determined authenticity to decide on the user request.

20 Claims, 5 Drawing Sheets

(56) References Cited

OTHER PUBLICATIONS

Yu et al.; Image based Static Facial Expression Recognition with Multiple Deep Network Learning; Published in: ICMI '15 Proceedings of the 2015 ACM on International Conference on Multimodal Interaction; pp. 435-442; ACM Digital Library (Year: 2015).*
A. Savoiu et al., "Recognizing Facial Expressions Using Deep Learning," 2017, 7 pages.
S. Venneti, "Revealing True Emotions Through Micro-Expressions: A Machine Learning Approach," Jan. 15, 2018, Software Engineering Institute, https://insights.sei cmu.edu/sei_blog/2018/01/revealing-true-emotions-through-micro-expressions-a-machine-learning-approach.html, 6 pages.

* cited by examiner

US 10,423,773 B1

COMPUTERIZED SYSTEMS AND METHODS FOR DETERMINING AUTHENTICITY USING MICRO EXPRESSIONS

TECHNICAL FIELD

The present disclosure generally relates to computerized systems and methods for determining authenticity. In particular, embodiments of the present disclosure relate to inventive and unconventional systems for determining authenticity using micro expressions of a human user.

BACKGROUND

As the Internet has become more wide-spread, electronic transactions have displaced face-to-face transactions. Types of electronic transactions can vary, including purchasing items and borrowing money. Because it is hard to determine authenticity of a transaction partner without face-to-face interaction, there exist various ways to detect fraud.

The existing methods to determine authenticity, however, are perfunctory in nature. They evaluate credibility of an applicant using transaction or credit history, and are thus limited to a small set of data that relates to the applicant. Moreover, transaction or credit history can be fabricated; therefore, the determination may not be accurate. Because of this reason, the existing methods often require face to face interaction or phone conversation with the person engaging the transaction. By doing this, however, the cost of the transactions increases, and the process gets delayed. Therefore, there is a need for improved systems and methods for accurately determining authenticity in an electronic manner.

SUMMARY

One aspect of the present disclosure is directed to a method for calculating authenticity of a human user. The method may be performed by a device having at least one processor. The method may comprise receiving, via a network, an electronic request from a user device, the request instantiating a video connection with the user device. The method may comprise generating, using a database of questions, a first question regarding the request. The method may comprise providing, via the network, the generated question to the user device. The method may comprise analyzing video and audio data received via the connection, the analyzing comprising extracting a plurality of facial expressions from the video data. The method may comprise calculating, using a first convolutional neural network, first data corresponding to one or more predetermined emotions based on at least one extracted facial expression, and using a second convolutional neural network, second data corresponding to the one or more predetermined emotions based on at least two extracted facial expressions and the audio data. The method may comprise generating candidate emotion data using the first and second data. The method may comprise determining whether the candidate emotion data predicts a predetermined emotion. Based on determining whether the candidate emotion data predicts the one or more predetermined emotions, the method may comprise generating a second question to collect additional data for aggregating with the first and second data or determining the authenticity of the user and using the determined authenticity to decide on the user request.

Another aspect of the present disclosure is directed to a computer system for calculating authenticity of a human user. The system may comprise at least one processor and at least one memory storing instructions. The system may receive, via a network, an electronic request from a user device, the request instantiating a video connection with the user device. The system may generate, using a database of questions, a first question regarding the request. The system may provide, via the network, the generated question to the user device. The system may analyze video and audio data received via the connection, the analyzing comprising extracting a plurality of facial expressions from the video data. The system may calculate, using a first convolutional neural network, first data corresponding to one or more predetermined emotions based on at least one extracted facial expression, and using a second convolutional neural network, second data corresponding to the one or more predetermined emotions based on at least two extracted facial expressions and the audio data. The system may generate candidate emotion data using the first and second data. The system may determine whether the candidate emotion data predicts a predetermined emotion. Based on determining whether the candidate emotion data predicts the one or more predetermined emotions, the system may generate a second question to collect additional data for aggregating with the first and second data or determine the authenticity of the user and use the determined authenticity to decide on the user request.

Yet another aspect of the present disclosure is directed to a method for calculating authenticity of a human user. The method may be performed by a device having at least one processor. The method may comprise receiving, via a network, an electronic request from a user device, the request instantiating a video connection with the user device. The method may comprise generating, using a database of questions, a first question regarding the request. The method may comprise providing, via the network, the generated question to the user device. The method may comprise analyzing video and audio data received via the connection, the analyzing comprising extracting a plurality of facial expressions from the video data. The method may comprise calculating, using a spatial convolutional neural network, first data corresponding to one or more predetermined emotions based on at least one extracted facial expression, and using a temporal convolutional neural network, second data corresponding to one or more of the predetermined emotions based on at least two extracted facial expressions and the audio. The method may comprise generating candidate emotion data using the first and second data. The method may comprise determining whether the candidate emotion data predicts a predetermined emotion. Based on determining whether the candidate emotion data predicts a predetermined emotion, the method may comprise generating a second question to collect additional data for aggregating with the first and second data or determining the authenticity of the user and using the determined authenticity to decide on the user request.

Other systems, methods, and computer-readable media are also discussed herein.

DETAILED DESCRIPTION

Figure 1:
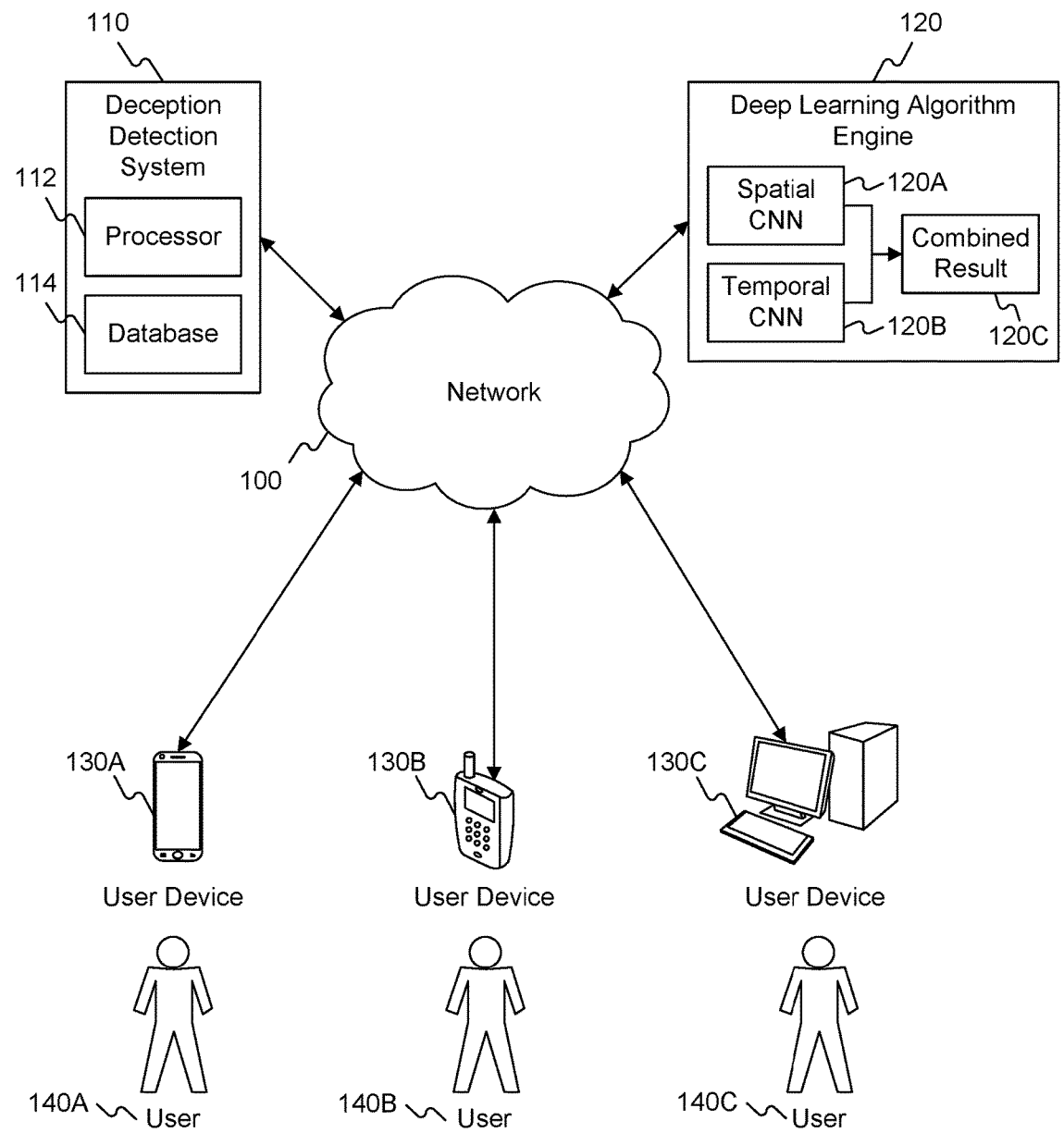
FIG. 1 depicts an exemplary network of devices in communication with a deception detection system (DDS), consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for determining authenticity of a human user. The disclosed embodiments are advantageously capable of determining authenticity using micro-expressions in an electronic manner. Micro-expressions may include involuntary fleeting facial movements, which last only a fraction of a second. Micro-expressions may also include micro eye movement or micro trembling of speech. They are subtle and nearly impossible to suppress and fake. Because micro-expressions can reveal emotions people may be trying to hide, recognizing micro-expressions can aid determining authenticity of a user.

In one implementation, a user device may send an electronic request to a server. Upon the request, the server may generate one or more questions for a user. The user device may receive the generated questions and display the questions for a user. The user device may receive answers from the user and send the answers to a deep learning algorithm engine (DLAE). The DLAE may analyze the answers that the user provides using two convolutional neural networks (CNN). CNNs are biologically inspired variants of multilayer perceptrons that are designed to emulate the behavior of a visual cortex where the brain processes visual information. The results from two CNNs are integrated into a single classifier that predicts the emotion associate with the user's micro-expression. If the emotion is not determined, the server generates more questions until the emotion is determined. When the emotion is determined, the user's authenticity may be determined using the determined emotion. The user's answers are analyzed and stored in the system, e.g., in a database.

In some embodiments, the user may be a loan applicant, and the described system may be used by financial institutions like a bank. When the user is a loan applicant, the system may determine the authenticity of the applicant by analyzing the applicant's answers using two CNNs. The two CNNs may include a spatial CNN and a temporal CNN. The results from two CNNs are integrated into a single classifier that predicts the emotion associate with the applicant's micro-expression. The present systems and the methods may determine an applicant's authenticity efficiently and accurately, managing the entire process electronically.

Referring to FIG. 1, an exemplary network of devices in communication with a deception detection system (DDS) 110 is shown. As illustrated in FIG. 1A, DDS 110 may communicate with a deep learning algorithm engine (DLAE) 120 and user devices 130A-130C via network 100. In some embodiments, DDS 110 may communicate with DLAE 120 or user devices via a direct connection, for example, using a cable.

DDS 110, in some embodiments, may be implemented as a computer system that determines a user's authenticity. DDS 110 may comprise a single computer or may be configured as a distributed computer system including multiple computers that interoperate to perform one or more of the processes and functionalities associated with the disclosed examples. In some embodiments, DDS 110 generates questions to ask to user 140, when receiving an electronic request from user devices 130A-130C.

As shown in FIG. 1, DDS 110 may comprise processor 112 and database 114. Processor 112 may be one or more known processing devices, such as a microprocessor from the Pentium™ family manufactured by Intel™ or the Turion™ family manufactured by AMD™. Processor 112 may constitute a single core or multiple core processor that executes parallel processes simultaneously. For example, processor 112 may use logical processors to simultaneously execute and control multiple processes. Processor 112 may implement virtual machine technologies or other known technologies to provide the ability to execute, control, run, manipulate, store, etc. multiple software processes, applications, programs, etc. In another example, processor 112 may include a multiple-core processor arrangement configured to provide parallel processing functionalities to allow DDS 110 to execute multiple processes simultaneously. One of ordinary skill in the art would understand that other types of processor arrangements could be implemented that provide for the capabilities disclosed herein.

Although not shown in FIG. 1, DDS 110 may include a memory. A memory may store one or more operating systems that perform known operating system functions when executed by processor 112. By way of example, the operating system may include Microsoft Windows, Unix, Linux, Android, Mac OS, iOS, or other types of operating systems. Accordingly, examples of the disclosed invention may operate and function with computer systems running any type of operating system. Memory may be a volatile or non-volatile, magnetic, semiconductor, tape, optical, removable, non-removable, or other type of storage device or tangible computer readable medium.

DDS 110 may include at least one database 114. Database 114 may store data that may be used by processor 112 for performing methods and processes associated with disclosed examples. Database 114 may be located in DDS 110 as shown in FIG. 1, or alternatively, it may be in an external storage device located outside of DDS 110. Data stored in database 114 may include any suitable data, such as information relating to potential questions to ask to a user. Questions may include typical questions that may be asked to any users, or questions that are customized for a user who interacts with DDS 110. Exemplary questions may include, "what is your income," "what is your profession," "how long have you stayed at your current address," "what is your phone number," and "what is your identification number."

Deep learning algorithm engine (DLAE) 120 may be located outside of DDS 110 as shown in FIG. 1. Alternatively, or additionally, in some embodiment, DLAE 120 may be located inside of DDS 110. DLAE 120 may analyze a user's answers using two CNNs. As discussed below with respect to FIG. 2, the two CNNs, in some embodiments, may include spatial CNN 120A and temporal CNN 120B. Spatial CNN 120A and temporal CNN may be known neural network, for example, VGG-16 and ResNet 50.

Spatial CNN 120A may be pre-trained on faces from image sources, and temporal CNN 120B may be pre-trained using video sources. The CNNs may be trained for one or more predetermined emotion classes using a dataset having labeled data for each emotion. One known example of such a dataset is ImageNet. ImageNet is a large visual dataset designed for use in visual object recognition software research.

In some embodiments, predetermined emotions may comprise any number of pre-determined emotion classes. For example, the pre-determined emotion classes may include happiness, surprise, disgust, and repression. The trained CNNs may have ground truths established for each emotion classes. In some embodiments, after the CNNs are trained, one or more additional data sets may be used to check accuracies of the established ground truths. The ground truths are the standard emotion based on which the user's emotion is measured. For example, if a user's micro facial expression perfectly matches the ground truth for happiness, then the user is 100% happy. But if a user's micro-expression matches only 50% with the ground truth for happiness, then the user is 50% happy. The results from two CNNs are integrated into a single classifier that predicts the emotion associate with the user's micro expression.

In some embodiments, a depiction of a user, including video and audio, may be pre-processed before DLAE 120 analyzes the depiction. In some embodiments, DLAE 120 may extract frames from video after DLAE 120 receives the video representing the user. The extraction frequency made be pre-determined. In some embodiment, DLAE 120 may extract frames every ten seconds from the received video. The exacted images may be analyzed using spatial CNN 120A and temporal CNN 120B.

As explained above, using the extracted frames, DLAE 120 may determine how similar user's face expressions to the ground truths for each emotion class. For example, DLAE 120 may analyze, using spatial CNN 120A, positions and actions of eyes, eyebrow, nose, mouth, etc. in the extracted frames. For example, a frame may include a user's micro-expression showing that the user is 30% anxious, 50% repressed, 70% surprised, and 20% happy, compared to the established ground truth. The analyzed results may be used as an input for temporal CNN 120B. Temporal CNN 120B may analyze the changes of the user's micro-expressions over time. In some embodiments, temporal CNN may analyze head shaking, head nodding, or micro eye-movement of a user. Temporal CNN 120B also may recognize voice micro trembling.

The result from spatial CNN 120A and temporal CNN 120B may be combined. In some embodiments, DLAE 120 may use ensemble methods, i.e. multiple learning algorithms, to combine two results. In some embodiments, the combined results may be further analyzed using logistic regression models.

Based on the combined result 120C, DLAE 120 may determine the user's emotions, which can be used to determine the user's authenticity. If the emotion is not determined, DDS 110 may generate more questions. The answers for the additional questions may be further analyzed by DLAE 120. DDS 110 may continue generating questions until the user's emotion is determined.

DDS 110 and DLAE 120 may communicate with user device such as tablet 130A, mobile device/PDA 130B, computer 130C, or the like. User devices 130A-130C may include a display. The display may include, for example, liquid crystal displays (LCD), light emitting diode screens (LED), organic light emitting diode screens (OLED), a touch screen, and other known display devices. The display may show various information to a user. For example, it may display questions generated by a server or results determined by DLAE 120.

User devices 130A-130C may include one or more input/output (I/O) devices. The I/O devices may include one or more devices that allow user devices 130A-130C to send and receive information from user 140A-140C or another device. The I/O devices may include various input/output devices, a camera, a microphone, a keyboard, a mouse-type device, a gesture sensor, an action sensor, a physical button, an oratory input, etc. For example, a user may provide a video of the user's face to DDS 110 through a camera and microphone of user device 130A-130C. The I/O devices may also include one or more communication modules (not shown) for sending and receiving information from DDS 110 by, for example, establishing wired or wireless connectivity between user devices 130A-130C and network 100.

User devices 130A-130C may comprise a video camera or may be connected to a remote video camera. User devices 130A-130C may transmit video and audio signals to DDS 110. In some embodiments, video and audio signals may be compressed using a codec including, for example, MPEG-4, MPEG-2, a lossless codec, or other codecs. In some embodiment, the signals may be compressed using MPEG-4 and MPEG-2. In some embodiments, video and audio signals may be separately encoded and/or compressed using different codecs.

User 140A-140C may be any person who provides electronic request to DDS 110. In some embodiments, user 140A-140C may be a loan applicant. In some case, DDS may be employed by financial institutions such as bank and credit unions. User 140A-140C may use user devices 130A-130C to receive questions from DDS 110 and provide answers to DDS 110. The applicant's answers may be analyzed by DLAE 120.

Figure 2:
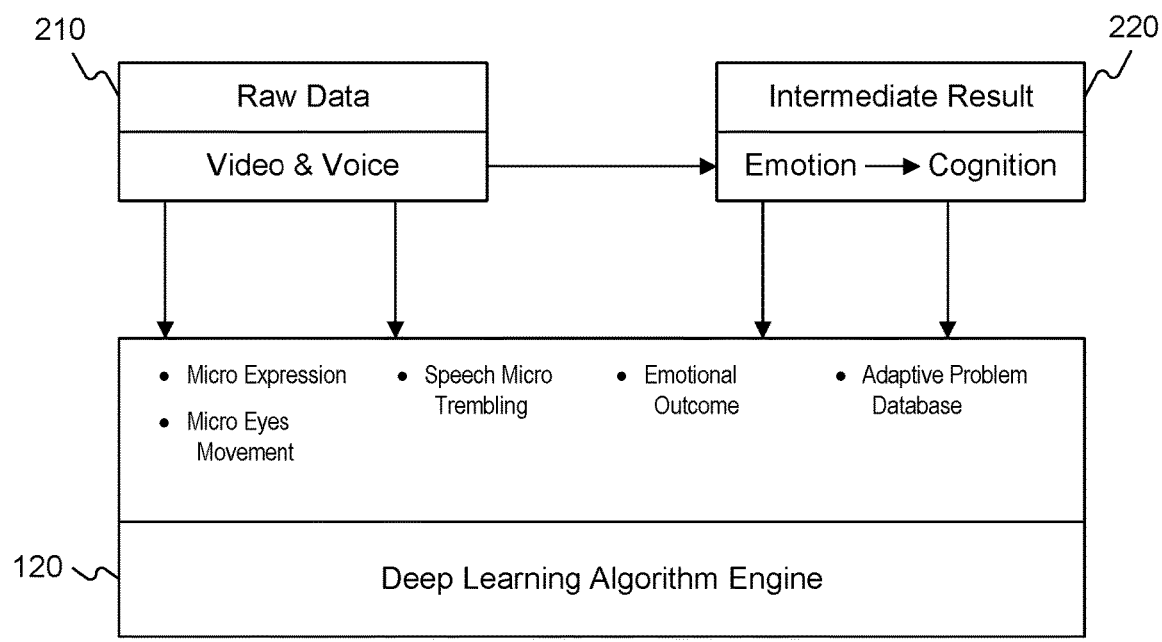
FIG. 2 is a flowchart of an exemplary method performed by a deep learning algorithm engine (DLAE), consistent with the disclosed embodiments.

FIG. 2 is a flowchart of an exemplary method performed by deep learning algorithm engine (DLAE), consistent with the disclosed embodiments. DLAE 120 may receive raw data 210 from user 140A-140C via user devices 130A-130C. Raw data 210 may include video and/or voice in user's answers in response to one or more questions. As explained above, facial expression and audio in raw data 210 may be analyzed using the two convolutional neural networks (CNN).

Through the analysis using CNNs, DLAE 120 may detect a user's micro-expression, such as micro facial expression, micro eye-movement, and speech micro trembling. As explained above, DLAE 120 may analyze a user's video and/or audio using spatial CNN 120A and temporal CNN 120B. Using the combined result, DLAE 120 may determine emotion as an intermediate result 220. Intermediate result 220 may be the probability distribution over the pre-determined emotion.

The intermediate result, in some embodiments, may be used to determine a user's authenticity. The authenticity may be scored based on the determined emotion. If the score is above a threshold value, the user may be considered to be truthful, and if the score is below a threshold value, the user may be considered to be untruthful.

Figure 3A:
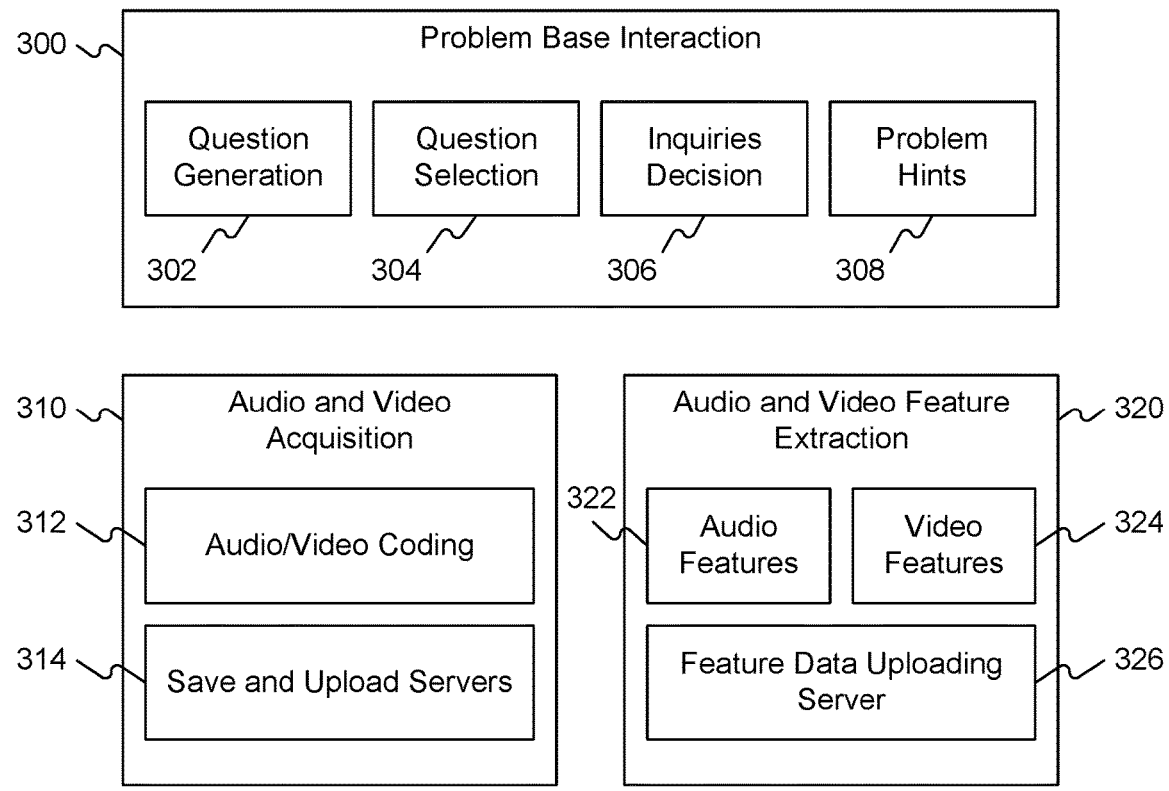
FIG. 3A depicts exemplary functions performed by a DDS with respect to client operation, consistent with the disclosed embodiments.

FIG. 3A depicts exemplary modules at a client side of DDS 110. These modules exemplify functions performed by DDS 110 with respect to client interaction. The division between client side and server side is for illustrative purposes, and the division is not required in all embodiments. The client-side of DDS 110 may include problem base interaction module 300, audio and video acquisition module 310, and audio and video feature extraction module 320. Problem base interaction module 300 may include question generation module 302, question selection module 304, inquiries decision module 306, and problem hints module 308.

Question generation module 302 may generate questions upon receiving an electronic request from user device 130A-130C. Question selection module 304 may select one or more questions to ask user 140. In some embodiments, generating and asking the questions may be done electronically, for example, by presenting a textual question, or using a text-to-speech module.

Question selection module 304 may use database 114, which stores suitable datasets, including potential questions that can be asked to a user. For example, the database 114 may include potential questions that relate to a user's income, profession, address, phone number or identification. In selecting question for user 140A-140C, question selection module 304 may consider any information that a user provided, including user's previous answers to one or more previous questions. In some embodiments, if a user's answer for a question is ambiguous, Question selection module 304 may select the next question to clarify the answer for the question. In some embodiments, question selection module 304 may rank the generated questions according to its importance and necessity.

Inquiries decision module 306 may determine if DDS 110 needs to ask further questions to determine a user's emotion. For example, analysis results of one or more user's previous answers are not sufficient to determine user's emotion, inquiries decision module 306 may signal DDS 110 that further question is required.

Problem hints module 308 may provide user 140A-140C one or more hints when a user's answer deviates from various predicted potential answers by more than expected. In some embodiments, problem hints module 308 may function to suggest proper answers to the current question. For example, DDS 110 may ask a loan applicant, "which day of the month will you pay the installments for the loan?" The user may misunderstand the question and may answer, "Wednesday." In that case, DDS 110 may provide problem hints 308 and ask, "which date each month?"

Audio and video acquisition module 310 may include audio/video coding module 312 and save and upload servers module 314. Audio/video coding module 312 may encode raw data received from user device 130A-130C before they are saved and uploaded to DDS 110. The coding may change raw data 210 into a different format that may be accessed, modified, or analyzed by DDS 110 and/or DLAE 120. As explained above, the codec may include MPEG-4, MPEG-2, a lossless codec, or other codecs. Save and upload servers module 314 may save the encoded raw data in DDS 110.

After a user's audio and video are saved and uploaded to DDS 110, audio and video features may be extracted. Audio and video feature extraction module 320 may include audio features module 322, video features module 324, and feature data uploading server module 326. In some embodiments, audio features module 332 may extract audio data, and video features module 324 may extract video data. The extraction may be made with pre-determined frequency. For example, audio features module 322 and video features module 324 may extract audio and/or frames every ten seconds from the received video. The exacted images may be analyzed using spatial CNN 120A and temporal CNN 120B.

Figure 3B:
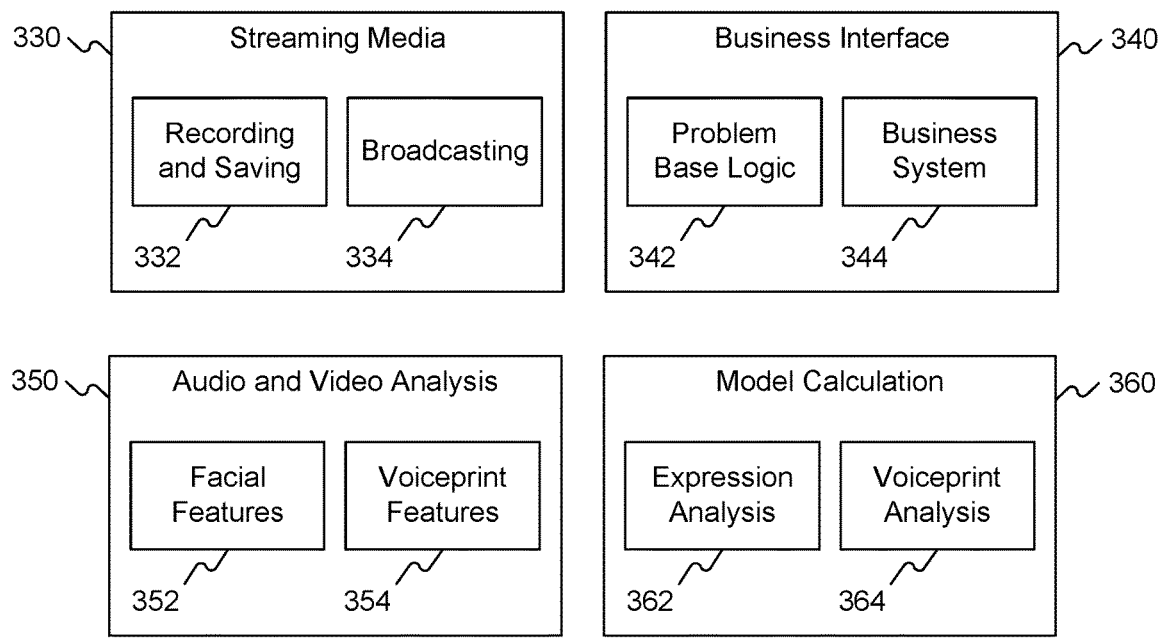
FIG. 3B depicts exemplary functions performed by a DDS with respect to server operation, consistent with the disclosed embodiments.

FIG. 3B depicts exemplary modules at a server side of DDS 110. These modules exemplify functions performed by DDS 110 with respect to internal interaction between systems, such as DLAE 120. As explained above, the division between client side and server side is for illustrative purposes, and the division is not required in all embodiments. Server side modules at DDS 110 may include streaming media module 330, business interface module 340, audio and video analysis module 350, and model calculation module 360.

Streaming media module 330 may include recording and saving module 332 and broadcasting module 334. The extracted data via audio and video feature extraction module 320, may be recorded and saved in a server for broadcasting by recording and saving module 332. The server may be the same server as the server used to save extracted data in FIG. 3A but may be a different server located in DDS 110. In some embodiment, the server may be located outside of DDS 110. A codec, such as, MPEG-4, MPEG-2, a Lossless codec, or other video codec, may be used to save the audio and video data.

Broadcasting module 334 may broadcast the video and audio data saved in a server by recording and saving module 332. As explained above, the audio and video may be pre-processed before being broadcasted. By being broadcasted 334, the recorded and saved audio and video may send their pixel data and optical flow data to spatial CNN 120A and temporal CNN 120B.

Business interface module 340 may include problem base logic module 342 and business system module 344. In some embodiments, business interface module 340 may perform communication between business system module 344 and DSS 110 and/or DLAE 120. In some embodiments, Business interface module 340 is a software interface to connect DLAE 120 to business system 344. Software interface may be the languages and codes that the applications use to communicate.

Business system module 344 may communicate with DLAE 120 and receive the determined user's authenticity data from DLAE 120. As explained above, the authenticity may be scored based on the determined emotion. In some embodiments, if the score is above a threshold value, the user may be considered to be truthful. Based on a user's determined authenticity, business system module 344 may make business decisions, for example, a loan approval or denial decision.

Problem base logic module 342 may assist business system module 344 to make a business decision. Problem base logic module 342 may analyze user's answers or any additional information provided by the user to determine whether it is worth to do business with the user. For example, if the user answered the user's income is far below than average and/or the user has a debt of more than twice of his annual income, business system module 344 may determine that the user may not have strong financial capacity, which may lower a possibility to do a business with the user.

In some embodiments, a user may be a loan applicant. In the embodiments, business system module 344 may make loan approval decisions based on an applicant's determined authenticity. Through business interface module 340, business system module 344 may receive determined applicant's authenticity from DDS 110 and/or DLAE 120. Problem base logic module 342 may analyze a loan applicant's answers or a submitted loan application to assess an applicant's financial capability. Based on the assessed an applicant's financial capability, business system module 344 may also further determine an interest rate for an approved loan. For example, business system module 344 may decide a lower interest rate to those with better financial capabilities.

Audio and video analysis module 350 may analyze broadcasted audio and video data using spatial CNN 120A and temporal 120B. Audio and video analysis module 350 may include facial features module 352 and voiceprint features module 354. Facial features module 352 may be analyzed using two CNNs, spatial CNN 120A and temporal CNN 120B. The results from two CNNs are integrated into a single combined result 120C that predicts the emotion associate with the user's micro-expression. Voiceprint features module 354 may analyze broadcasted audio data using temporal CNN 120B. As explained above, temporal CNN may detect speech micro trembling.

Model calculation module 360 may include expression analysis module 362 and voiceprint analysis module 364. Expression analysis module 362 may receive result from facial features model 352 and calculate a user's emotion shown from the user's facial expression. Voiceprint analysis module 362 may receive results from voiceprint features 354 and calculate a user's emotion shown from the user's voice trembling. In some embodiments, the voice may be analyzed using one of more CNNs that was trained using databases including voice data. Calculations from expression analysis module 362 and voiceprint analysis module 364 are combined. Based on the combined result, model calculation module 360 may determine the user's emotion.

Figure 4:
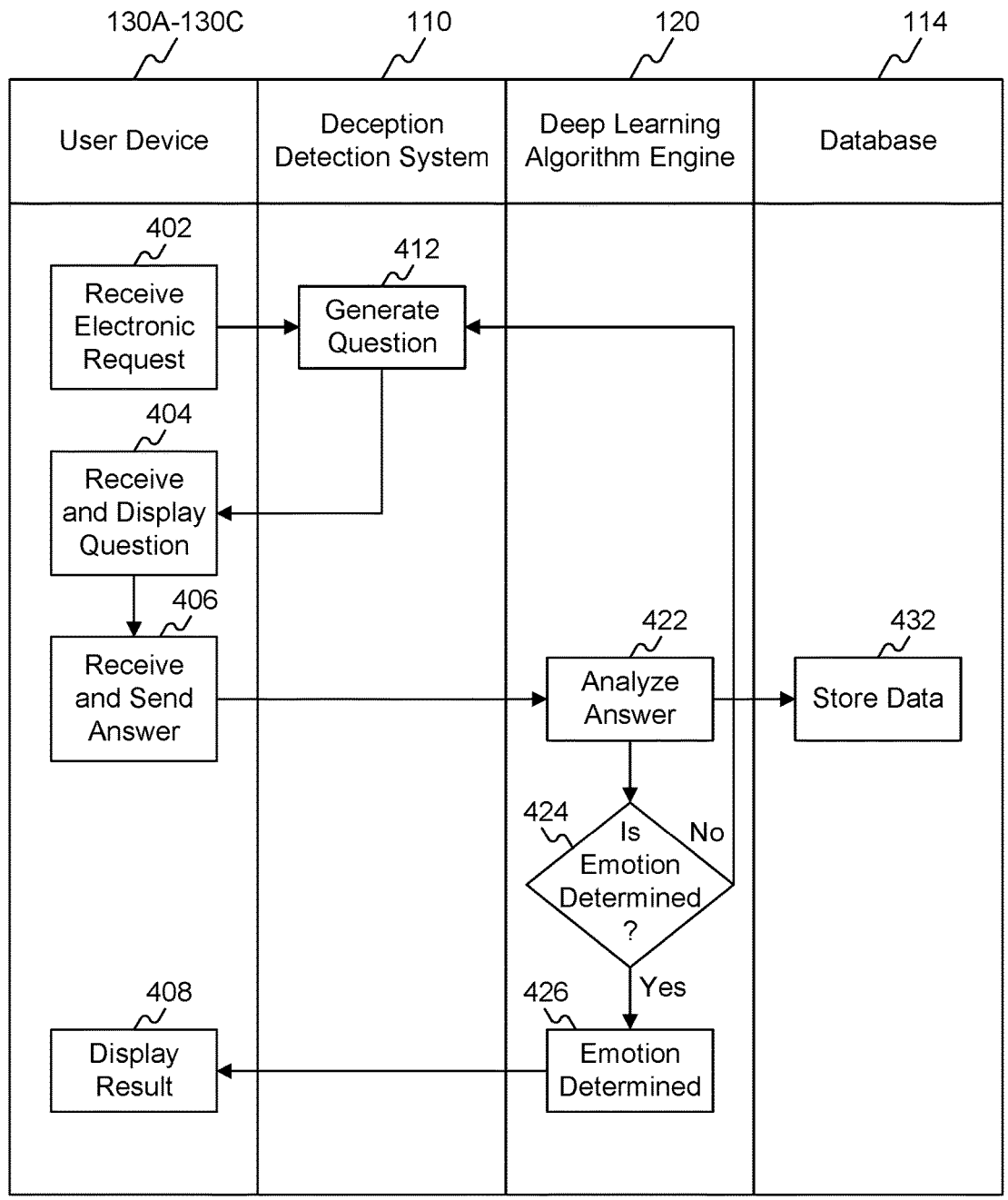
FIG. 4 is a flowchart of an exemplary method for determining authenticity, consistent with the disclosed embodiments.

FIG. 4 is a flowchart of an exemplary deception detecting method. A deception detection method may comprise steps involving user device 130A-130C, deception detection system (DDS) 110, deep learning algorithm engine (DLAE) 120, and database 114.

In step 402, user device 130A-130C may generate an electronic request for a user (e.g., user 140A in FIG. 1). In some embodiments, user 140A may be a loan applicant and an electronic request may be generated when the applicant submits a loan application. In step 412, DDS 110 may receive the request and may generate one or more questions for user 140A-140C. The question may relate to a user's income, profession, address, phone number, or identification. In step 404, user device 130A-130C may receive generated question from DDS 110 and display the question on user device 130A-130C.

In step 406, user device 130A-130C may receive an answer from user 140A-140C and send the answer to DLAE 120. In step 422, DLAE 120 may analyze the received answer using two CNNs as explained above. In step 424, DLAE 120 may determine, using the analysis results, whether the user's emotion is determined 424. When DLAE 120 obtains a clear result on the emotion detection, the emotion may be considered determined. In step 432, the analysis results are stored in database 114, which DDS 110 may use in the future.

In step 426, DLAE 120 determines that the user's emotion and communicate this with user device 130A-130C. As explained above in FIG. 3B, the determined emotion may be used for DDS 110 to calculate the user's authenticity and finally make a business decision. In step 408, user device 130A-130C may display a determined business decision in response to user's electronic request.

If user's emotion is not determined in step 424, DLAE 120 may signal DDS 110 that additional question is required. Thus, in step 412, DDS 100 may generate one or more further questions. As explained above, in step 422, DLAE 120 may analyze user's additional answers. DDS 110 may generate additional questions until DLAE 120 determines that user's emotion is determined. The analyzed answers may be stored in database 114. As explained above, DDS 110 may have adaptive learning capacity and improve as it interacts with users and store more data from the users and could generate sharper questions when detect the customer might be lying.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for calculating authenticity of a human user, performed by a device having at least one processor, the method comprising:

receiving, via a network, an electronic request from a user device, the electronic request instantiating a video connection with the user device;

generating, using a database of questions, a first question regarding the electronic request;

providing, via the network, the generated first question to the user device;

analyzing video and audio data received via the video connection, the analyzing comprising extracting a plurality of facial expressions from the video data;

calculating, using a first convolutional neural network, first data corresponding to one or more predetermined emotions based on at least one extracted facial expression, and using a second convolutional neural network, second data corresponding to the one or more predetermined emotions based on at least two extracted facial expressions and the audio data;

generate candidate emotion data using the first and second data;

determining whether the candidate emotion data predicts a predetermined emotion;

based on determining whether the candidate emotion data predicts the predetermined emotion:

generating a second question to collect additional data for aggregating with the first and second data; or determining the authenticity of the human user and using the determined authenticity to decide on the electronic request.

2. The method of claim 1, wherein the first convolutional neural network comprises a spatial convolutional neural network and the second convolutional neural network comprises a temporal convolutional neural network.

3. The method of claim 2, further comprising training at least one of the convolutional neural networks using a database of resources, the database of resources comprising face data labeled to establish ground truth of the one or more pre-determined emotions.

4. The method of claim 3, further comprising:

normalizing the database of resources using time interpolation; and training the temporal convolutional neural network using the normalized database of resources.

5. The method of claim 1, wherein the two convolutional neural networks analyze the human user's micro expressions.

6. The method of claim 2, wherein the temporal convolutional neural network analyzes the audio data.

7. The method of claim 1, wherein the one or more predetermined emotions comprises surprise, disgust, or repression.

8. The method of claim 1, wherein generating the second question is based on a received answer to at least the first question.

9. The method of claim 1, wherein the human user is a loan applicant.

10. A computing system for calculating authenticity of a human user, comprising:

at least one processor;

at least one memory storing instructions, wherein the instructions cause the at least one processor to:

receive, via a network, an electronic request from a user device, the electronic request instantiating a video connection with the user device;

generate, using a database of questions, a first question regarding the electronic request;

provide, via the network, the generated first question to the user device;

analyze video and audio data received via the video connection, the analyzing comprising extracting a plurality of facial expressions from the video data;

calculate, using a first convolutional neural network, first data corresponding to one or more predetermined emotions based on at least one extracted facial expression, and using a second convolutional neural network, second data corresponding to the one or more predetermined emotions based on at least two extracted facial expressions and the audio data;

generate candidate emotion data using the first and second data;

determine whether the candidate emotion data predicts a predetermined emotion;

based on determining whether the candidate emotion data predicts the predetermined emotion:

generate a second question to collect additional data for aggregating with the first and second data; or determine the authenticity of the human user and use the determined authenticity to decide on the electronic request.

11. The system of claim 10, wherein the first convolutional neural network comprises a spatial convolutional neural network and the second convolutional neural network comprises a temporal convolutional neural network.

12. The system of claim 11, wherein the instructions further cause the at least one processor to train at least one of the convolutional neural networks using a database of resources, the database of resources comprising face data labeled to establish ground truth of the one or more predetermined emotions.

13. The system of claim 12, wherein the instructions further cause the at least one processor to:

normalize the database of resources using time interpolation; and train the temporal convolutional neural network using the normalized database of resources.

14. The system of claim 10, wherein the two convolutional neural networks analyze the human user's micro expressions.

15. The system of claim 11, wherein the temporal convolutional neural network analyzes the audio.

16. The system of claim 10, wherein the one or more predetermined emotions comprises surprise, disgust, or repression.

17. The system of claim 10, wherein generating the second question is based on a received answer to at least the first question.

18. The system of claim 10, wherein the human user is a loan applicant.

19. The system of claim 10, wherein the user device provides at least seven questions to the human user.

20. A method for determining authenticity of a loan applicant, performed by a user device having at least one processor, the method comprising:

receiving, via a network, an electronic request from a user device, the electronic request instantiating a video connection with the user device;

generating, using a database of questions, a first question regarding the electronic request;

providing, via the network, the generated first question to the user device;

analyzing video and audio data received via the video connection, the analyzing comprising extracting a plurality of facial expressions from the video data;

calculating, using a spatial convolutional neural network, first data corresponding to one or more predetermined emotions based on at least one extracted facial expression, and using a temporal convolutional neural network, second data corresponding to the one or more of the predetermined emotions based on at least two extracted facial expressions and the audio;

generating candidate emotion data using the first and second data;

determining whether the candidate emotion data predicts a predetermined emotion;
based on determining whether the candidate emotion data predicts the predetermined emotion:
generating a second question to collect additional data for aggregating with the first and second data; or
determining the authenticity of the loan applicant and using the determined authenticity to decide on the electronic request.

* * * * *